United States Patent
Swam

(12)
(10) Patent No.: US 6,831,930 B1
(45) Date of Patent: Dec. 14, 2004

(54) ACCESS PANEL FOR NETWORK END LINESHARING ADSL/POTS SPLITTER APPLICATIONS

(75) Inventor: Steve Swam, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 692 days.

(21) Appl. No.: 09/707,165

(22) Filed: Nov. 6, 2000

(51) Int. Cl.[7] ................................................ H04J 3/04
(52) U.S. Cl. .................... 370/535; 370/246; 370/250; 379/399
(58) Field of Search ........................... 370/535, 242, 370/244, 250, 248, 357, 380; 379/399, 21.03, 94, 93.01, 93.06, 93.07, 93.09, 15.1, 26.01, 27.01, 29.05

(56) References Cited

U.S. PATENT DOCUMENTS

| 5,408,260 | A | | 4/1995 | Arnon | |
|---|---|---|---|---|---|
| 6,278,769 | B1 | * | 8/2001 | Bella | .................. 379/29.11 |
| 6,362,630 | B1 | * | 3/2002 | Lowell et al. | ............... 324/600 |
| 6,470,074 | B2 | * | 10/2002 | Teixeria | ................... 379/32.04 |
| 6,480,575 | B2 | * | 11/2002 | Chea et al. | ...................... 379/9 |
| 6,496,566 | B1 | * | 12/2002 | Posthuma | ..................... 379/22 |
| 6,532,216 | B1 | * | 3/2003 | Tennyson | ................... 370/244 |
| 6,574,309 | B1 | * | 6/2003 | Chea et al. | ...................... 379/9 |
| 6,584,148 | B1 | * | 6/2003 | Zitting et al. | ............... 375/222 |

FOREIGN PATENT DOCUMENTS

| EP | 1 175 078 A2 | 1/2002 |
|---|---|---|
| EP | 1 193 958 A1 | 4/2002 |
| WO | WO 01/45452 A2 | 6/2001 |
| WO | WO 01/65816 A2 | 9/2001 |
| WO | WO 01/93549 A2 | 12/2001 |

* cited by examiner

*Primary Examiner*—Dang Ton
*Assistant Examiner*—Tri H. Phan
(74) *Attorney, Agent, or Firm*—Merchant & Gould P.C.

(57) ABSTRACT

The present invention is directed to a telecommunications system and access panel for providing direct metallic access to a telecommunications carrier's signal pairs by a competitor while providing isolation between the telecommunications POTS service and the competitor's digital line service. The isolation is provided by placing DC blocking capacitors in the access panel. In another embodiment, direct metallic access is achieved by placing the access panel as an intermediate distribution frame member.

17 Claims, 8 Drawing Sheets

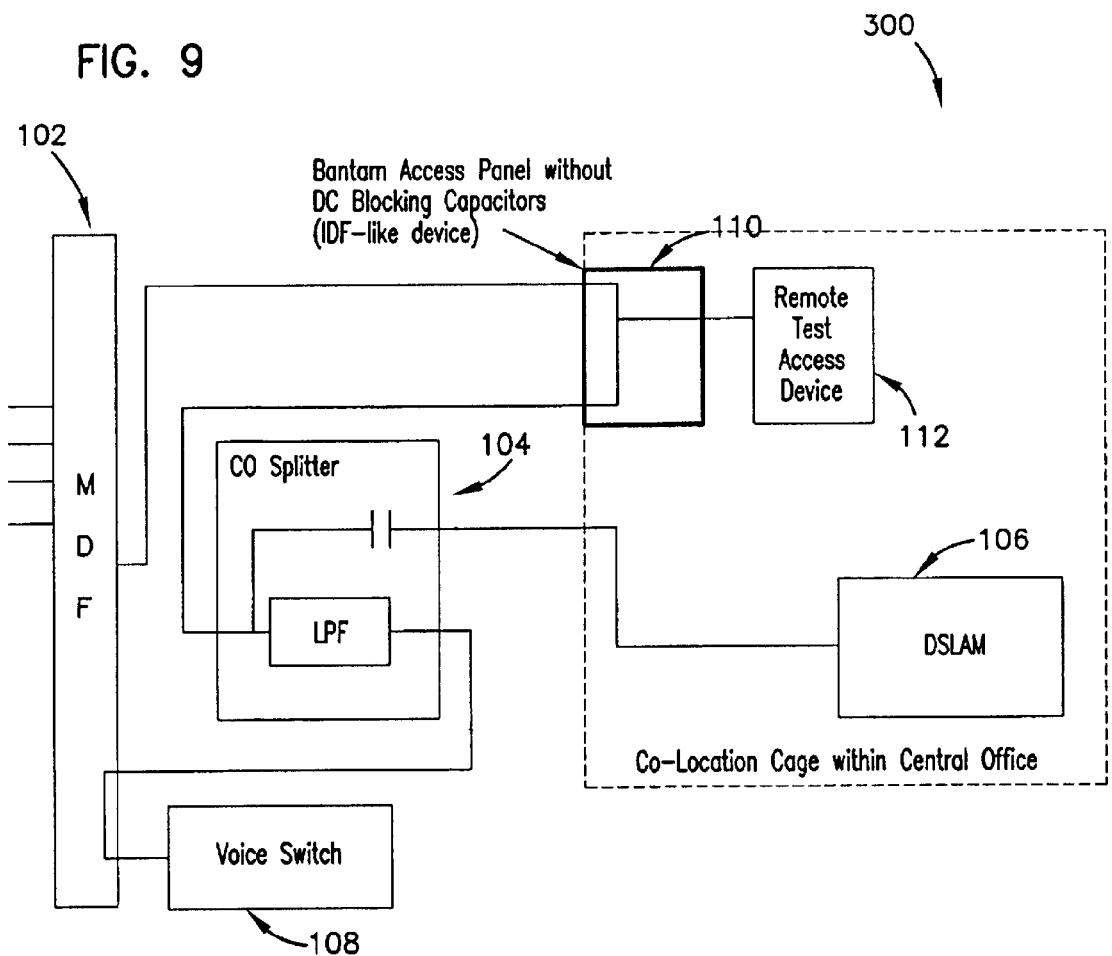

US 6,831,930 B1

ACCESS PANEL FOR NETWORK END LINESHARING ADSL/POTS SPLITTER APPLICATIONS

FIELD OF THE INVENTION

The present invention relates generally to telecommunications equipment. More particularly, the present invention relates to telecommunications equipment used in line sharing environments.

BACKGROUND OF THE INVENTION

Telecommunications systems are known which use cables containing bundles of twisted pairs of conductors for transmitting signals between locations for voice only signals, data only signals, and combined voice and data signals. In these systems, some of the telecommunications equipment for processing and transmitting the signals through the cables is configured for connection to cable connectors with multiple pairs of connectors, e.g. 25 pair Telco or Amp connectors. The connectors and cables provide links between the various pieces of telecommunications equipment in a twisted pair telephone system. In a telephone carrier system servicing residences and/or businesses, the system may include an MDF (Main Distribution Frame), a POTS (Plain Old Telephone Service) splitter for separating voice and data signals, and a DSLAM (Digital Subscriber Line Access Multiplexer).

The telecommunications industry offers various services that may be provided by Incumbent Local Exchange Carriers (ILECs) and Competitive Local Exchange Carriers (CLECs). Recent rulings promulgated by the Federal Communications Commission (FCC) and U.S. Congress have clarified the relationship and obligations between ILECs and CLECs. The term ILEC refers to a primary existing central office carrier, as distinguished from a new competitive carrier (CLEC) that came into existence after federal deregulation of the telecommunications industry.

A recent FCC Order directed to "line sharing" requires that ILECs must provide unbundled access to the high frequency bandwidth (e.g., data band) of the local loop to any CLEC that seeks to deploy any version of xDSL which is presumed to be acceptable for shared line deployment in accordance with the rules adopted in the ORder. In short, an ILEC must provide physical space in its central office, such as a collocation cage which will be described in greater detail hereinafter, and must also provide access to the ILEC's main distribution frame. From the consumer's perspective, the federally mandated interrelationship between ILECs and CLECs has provided the consumer with a wide variety of telecommunication service options, including, in particular, ADSL, IDSL (ISDN DSL), SDSL (Symmetric DSL) and VDSL (very high speed DSL) services. It is desirable to be able to easily test the communication lines of the system to identify errors.

SUMMARY OF THE INVENTION

In accordance with a first aspect of the invention, there is provided a telecommunications system. The system includes a main distribution frame, an access panel, a splitter unit, a voice switch and a multiplexer.

The main distribution frame is operatively coupled to a telecommunication carrier's signal lines. The access panel has inputs and outputs, and includes test ports for allowing a testing device to be coupled to the access panel wherein the inputs and outputs of the access panel are operatively coupled together unless a test device is coupled to the test ports and in that case the inputs are disconnected from the outputs, the inputs of the access panel are operatively coupled to the main distribution frame. The splitter unit is operatively coupled to the main distribution frame to receive mixed voice and data signals from the main distribution frame wherein the splitter unit has first outputs and second outputs and the splitter unit separates the voice signals from the mixed signals and outputs the voice signals at the first outputs. The voice switch is operatively coupled to the first outputs of the splitter unit.

The multiplexer is operatively coupled to the second outputs of the splitter unit, wherein when a test device is coupled to the test ports of the access panel, the test device has direct metallic access to the telecommunication carrier's signal lines for testing.

In accordance with a second aspect of the invention there is provided a telecommunication access panel. The panel includes input connectors for receiving signals from a splitter unit, output connectors for coupling signals to a multiplexer unit wherein the outputs are operatively coupled to the inputs, test ports for allowing a test device to be coupled to the access panel wherein when a test device is coupled to the test ports, the inputs are disconnected from the outputs and DC blocking capacitors operatively coupled between the inputs and outputs to provide DC isolation of the inputs from the outputs.

BRIEF DESCRIPTION OF THE DRAWINGS

FIG. 9 is a diagram of still another preferred embodiment of a telecommunication system according to the present invention.

DETAILED DESCRIPTION OF THE PRESENTLY PREFERRED EMBODIMENTS

Figure 1:
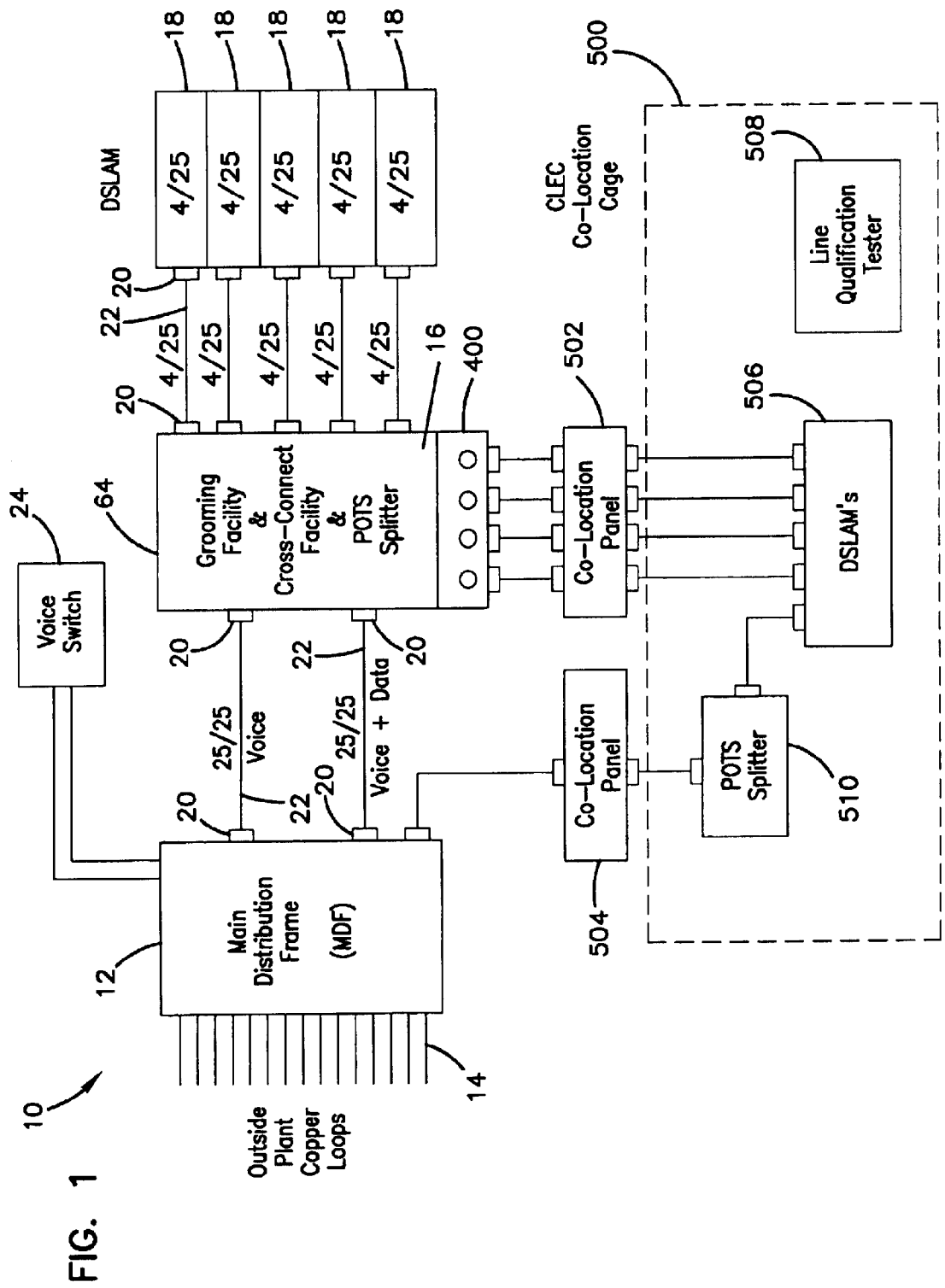
FIG. 1 is a diagram of a telecommunication system.

FIG. 1 is a diagram of a telecommunication system in a line sharing environment. The telecommunications system 10 is shown including a known arrangement of equipment, cable or lines, and connectors for transmitting signals, such as in a twisted pair telephone system. System 10 is representative of a telephone carrier's system for transmitting voice and data to residences and businesses. A main distribution frame (MDF) 12 is linked to a telecommunication carrier's signal lines, an ILEC's telecommunications system 14. MDF 12 has links to a POTS splitter device 16 and one or more DSLAM cards or modules 18. MDF 12, POTS splitter device 16, and DSLAMs 18 include connectors 20 having pairs of conductors for connecting to pairs of conductors of a reciprocal connector on an end of a cable 22. An example of connectors 20 shown in FIG. 1 are 25 pair connectors, such as Telco or AMP connectors, for use with a 25 pair cable 22 (containing 50 wire conductors). In use of system 10, POTS splitter device 16 receives voice and data signals from MDF 12, and passes the data signals through to DSLAM 18. The voice signals are passed from POTS splitter device 16 to MDF 12 for transmission to a voice switch 24. A collocation cage 500 is provided so that a CLEC may offer services. As will be discussed in greater detail hereinafter, the collocation cage 500 represents a partitioned section of an Incumbent Local Exchange Carrier's (ILEC) central office in which equipment owned and operated by a CLEC is located. Collocation cage 500 includes a CLEC's DSLAMs 506, line qualification tester 508, and may further include a number of POTS splitter devices 510. Collocation panels 502, 504 provide a termination location for establishing electrical connectivity between ILEC and CLEC equipment.

Within the context of the embodiment depicted in FIG. 1, telecommunications unit 64, which incorporates a test access capability via access jacks 400, represents a demarcation location or apparatus that defines a physical point of separation between the equipment owned/managed by the ILEC and that owned/managed by the CLEC. Direct access to each of the lines passing between the ILEC and CLEC equipment permits each entity the opportunity to monitor individual lines and to determine the location and responsibility of a given problem, should one arise.

It is desirable that there be DC blocking between the DSLAM and the splitter so that DC faults between the splitter and the DSLAM do not affect the POTS service. Oftentimes this is accomplished by including DC blocking capacitors in the DSL port of the splitter. In a line sharing environment, this poses a problem for accessing the outside loop plant from the DSLAM side because direct access to the metallic outside plant pairs, i.e. telecommunication carrier's signal lines 14, is not available for testing purposes. On the other hand, by providing direct metallic access in a collocation environment, a metallic impairment may result which could render POTS service unavailable. Thus, it is desirable to provide direct metallic access from the DSLAM side while still providing a sufficient safeguard against situations that may result in impaired POTS service.

Figure 2:
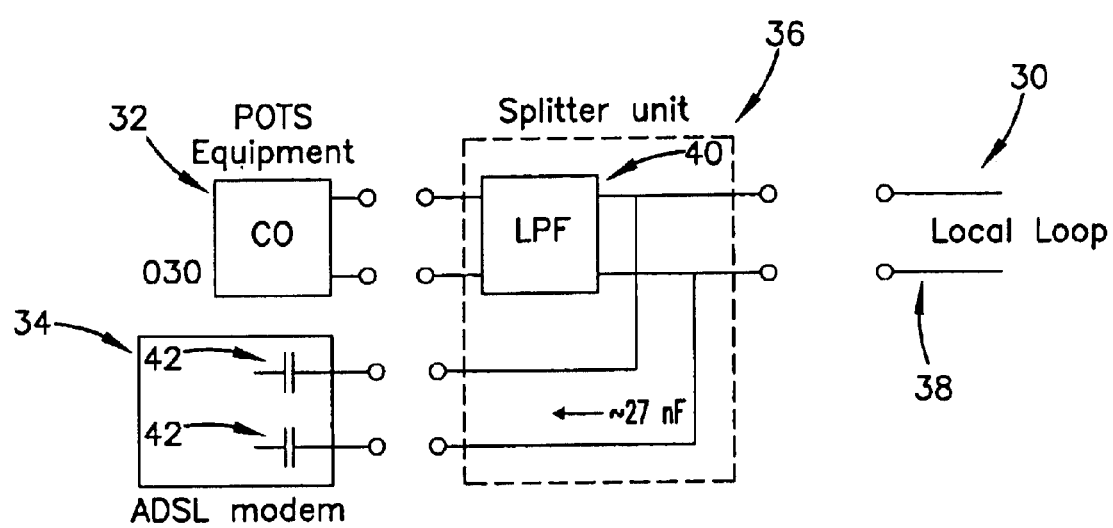
FIGS. 2–6 are diagrams of examples of known telecommunications systems.

FIG. 2 is a diagram of a known telecommunication system 30. The system 30 includes a central office 32, an ADSL modem 34 which forms part of a DSLAM (not shown), a splitter unit 36 and a local loop 38. The splitter unit 36 includes a low pass filter 40 and the ADSL modem includes DC blocking capacitors 42. The splitter unit 36 receives voice and data signals from the local loop 38 and filters out the voice signals that are then sent to the central office 32 which houses plain old telephone service (POTS) equipment. The ADSL modem 34 includes a high pass filter (not shown) so that the voice signals are filtered from the data signals. The system 30 shown in FIG. 1 is commonly used for the "non bundled" loop where the same operator is responsible for the quality of both the POTS and ADSL services.

If the system 30 is used in an "unbundled" situation where an ILEC provides the POTS and a CLEC provides the ADSL service, there is a risk of a bridged tap effect that may possibly adversely affect the quality of the POTS service. This could happen if the splitter 36 is at the POTS operator exchange and there is a cable of some length to the DSLAM. In addition, the ADSL operator has unnecessary access to the POTS service.

Figure 3:
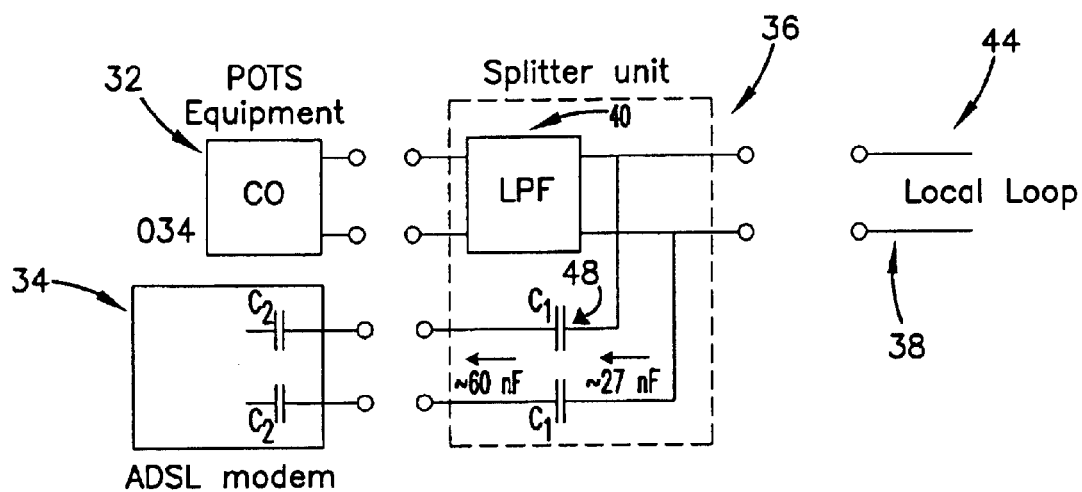
Figure 4:
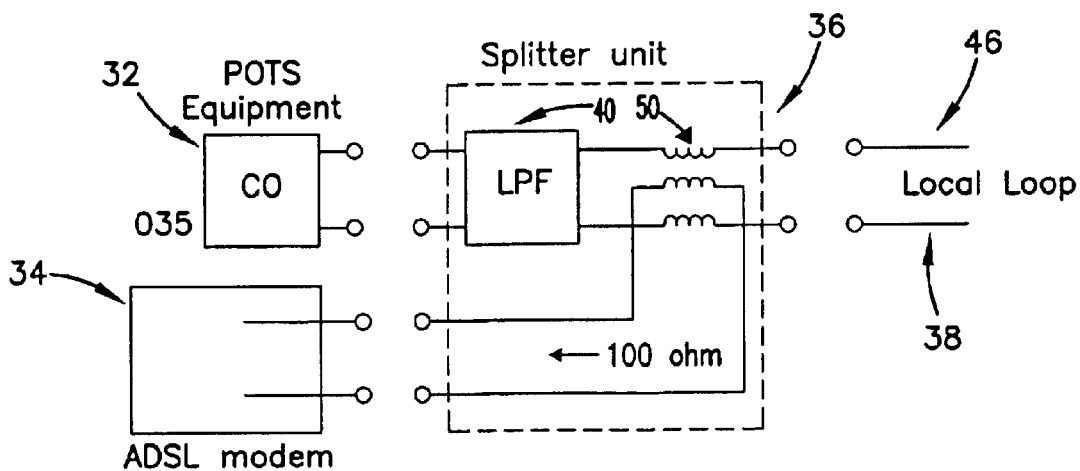

FIGS. 3 and 4 are diagrams of other known telecommunication systems. Like reference numerals will be used to designate like elements. The systems 44 and 46, shown in FIGS. 3 and 4 have splitter units 36 with DC blocking capacitors 48 (or in the case of FIG. 4 inductors 50) in the splitter unit 36 instead of the ADSL modem 34. In FIG. 3 a parallel solution is shown whereas in FIG. 4 a series solution is shown.

These systems 44 and 46 may be used in the "unbundled" situation. The ADSL operator has partial access to the POTS service, only to the AC signals; the DC signals are blocked by capacitors 48 located in the splitter unit 36. The voice quality aspects of splitters may be controlled by the POTS or by the ADSL operator depending on the location of the splitter unit. Voice quality may not be the highest priority of the ADSL operator. As with the system described in FIG. 1, there is a risk for a bridged tap effect if the splitter is at the POTS operator's exchange and there is cable with some length to the ADSL operator's DSLAM. The DC-blocking function in the splitter united limits this effect but does not eliminate it. The main advantage of having the DC-blocking function in the splitter unite is to prevent DC faults between the splitter and the ADSL modem affecting the POTS service. However, DC faults having no AC effects in the voice band are rare, so the advantage of this solution appears limited. A problem with the method described in FIG. 4 could be that the DC loop current passing through the transformer reduces its dynamic range and the possibly resulting non-linearity may cause intermodulation distortion to the DSL. A solution would be to use larger magnetic components resulting in a size and cost penalty.

Figure 5:
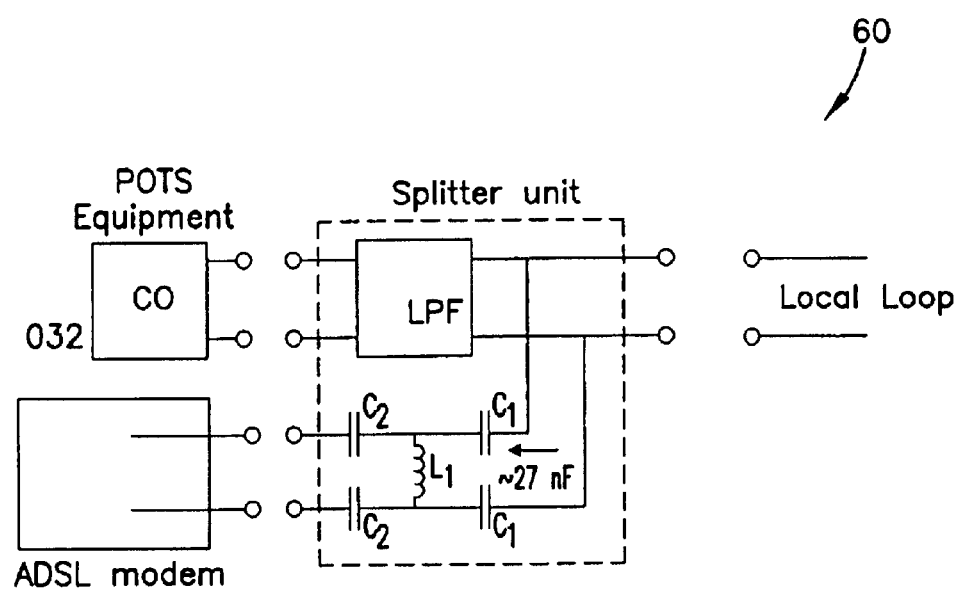

FIG. 5 is another known telecommunication system 60. In the system shown in FIG. 5, the low pass filter, high pass filter and DC blocking capacities capacitors are all located in the splitter unit.

The solution shown in FIG. 5 is also suitable for the "unbundled" situation. The full HPF is in the splitter unit. This option provides a good separation of services if the splitter is used by the operator of the access network. The ADSL and POTS operators have no access to each other's services. The responsibilities for the relevant services are more clearly allocated. The quality of the splitter is a matter of the access network operator. There is a risk of the bridged tap effect if there is a long cable between the splitter unit and the DSLAM. The requirements for the HPF in the receiver of the ADSL modem may be relaxed thus allowing possible cost savings. The operator can only use the frequency band for the relevant service. This could be important if there is a difference in the cost of renting a line for an ADSL service only or for both services i.e. ADSL and POTS. Compared with options 2 and 4 (FIG. 3 and 4), this option provides better isolation for the POTS service (from Line-port to ADSL-port). A disadvantage with this option could be a cost penalty.

To keep the power supply voltages used by the ADSL modem line driver low, it is common to use a step up transformer, where conveniently the inductance becomes the shunt impedance of the HPF. With the single choke arrangement shown, this beneficial twin use of the transformer is lost.

Figure 6:
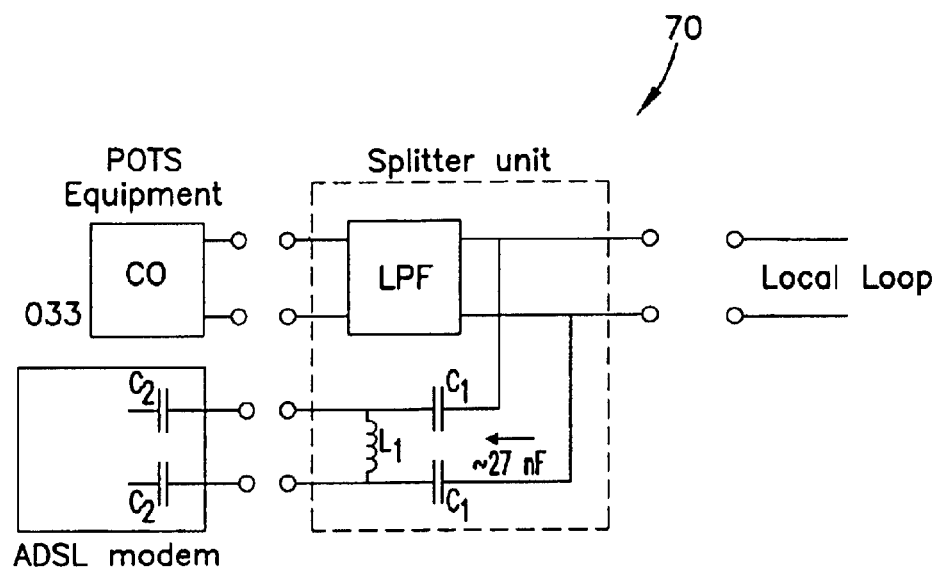

FIG. 6 is another known telecommunication system 70. In the system, the low pass filter, DC blocking capacitors and part of the high pass filter are located in the splitter unit. The solution shown in FIG. 6 is also suitable for use in the "unbundled" situation. It is comparable with the system shown in FIG. 4 but it requires fewer matched capacitors. This option provides a good separation of services if the splitter is used by the operator of the access network. The ADSL and POTS operators have no access to each other's services. The responsibilities for the relevant services are more clearly allocated. The quality of the splitter is a matter of the access network operator. There is no risk of a bridged tap effect if there is a long cable between the splitter unit and the DSLAM. The requirements for the HPF in the receiver of the ADSL modem may be relaxed, thus allowing possible cost savings. The operator can only use the frequency band for the relevant service. This could be important if there is a difference in the cost of renting a line for an ADSL service only or for both services, i.e., ADSL and POTS. This solution would be more expensive than the systems shown in FIGS. 2–4 but less than the system shown in FIG. 5

Figure 7:
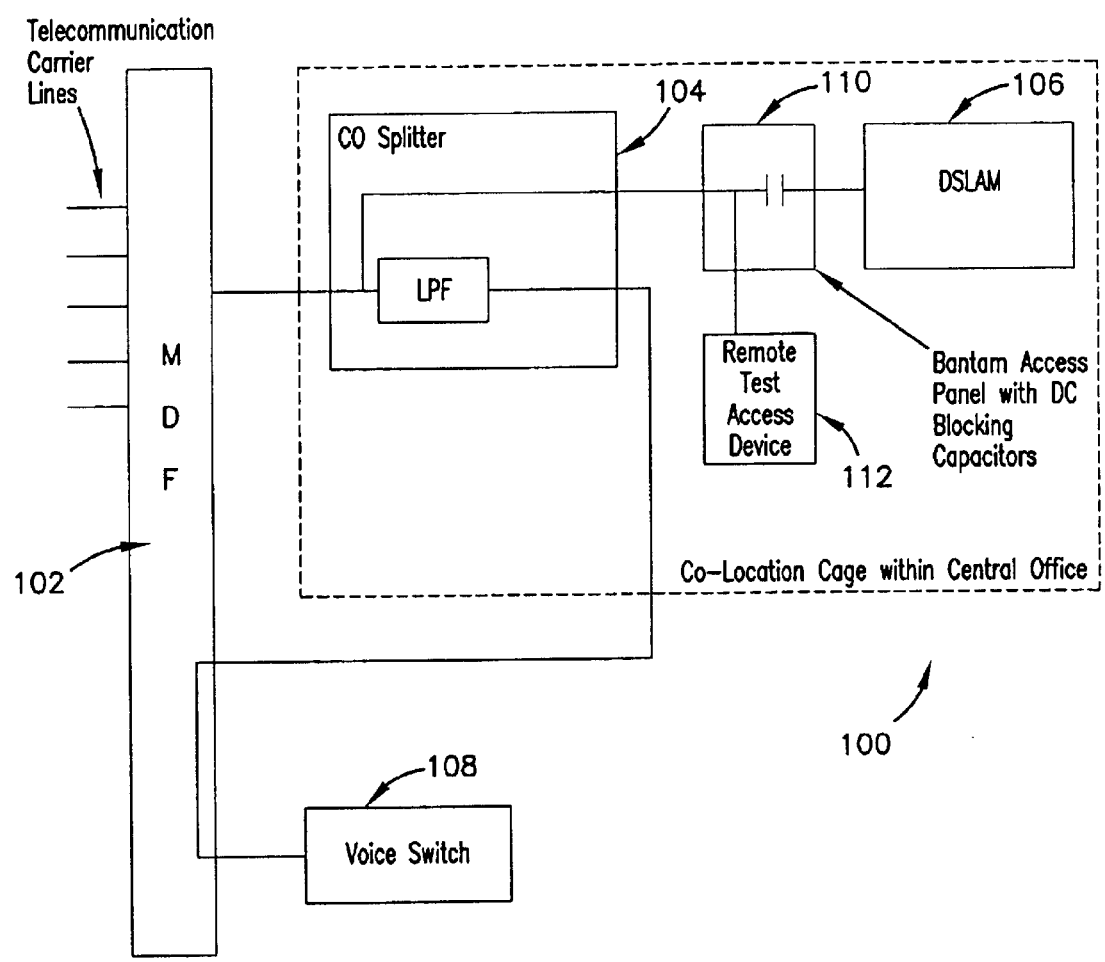
FIG. 7 is a diagram of a preferred embodiment of a telecommunication system according to the present invention.

FIG. 7 is a diagram of a telecommunication system 100 according to a first preferred embodiment of the present invention. The system 100 includes a main distribution frame 102, a splitter unit 104, a DSLAM 106, a voice switch 108, an access panel 110 and a remote test access device 112. In this environment, the CLEC owns the splitter unit 104 and the access panel 110 and DSLAM 106 are located in a collocation cage within an ILEC's central office. In this preferred embodiment, the DC blocking capacitors have been removed from the splitter unit 104. Instead, DC blocking capacitors of which only one is shown is included in the access panel 110. The access panel 110 uses bantam jacks and 25 pair connectors mounted to a printed circuit board to achieve a very high density in a small space. The inclusion of DC blocking capacitors allows the use of non-DC blocked splitter units thereby providing direct metallic access while maintaining DC isolation at the DSLAM port. In the preferred embodiment shown, the remote test access device 112 is coupled between the splitter unit 104 and access panel 110 although, depending on wiring schemes, it could be coupled between the DC blocking capacitor and DSLAM 106. As previously mentioned, in a line sharing environment, the problem of accessing the telecommunication carrier's lines from the DSLAM side exists when the DC blocking capacitors are implemented in the DSL port of the splitter unit. By removing the DC blocking capacitors from the splitter unit and optionally placing them in the access panel, direct metallic access can be obtained. A disadvantage associated with the embodiment shown in FIG. 7 is that the low pass filter is still connected to the voice switch 108 and line port thus resulting in an effective bridge tap appearance to the remote test access device 112. The effect of this bridge tap can be compensated for with software.

Thus, the removal of the DC blocking capacitors from the splitter unit allows direct access to the metallic outside plant pairs. However, this is undesirable as a metallic impairment within the collocation environment could render POTS service unavailable. By placing the DC blocking capacitors in the access panel, the probability of such a fault condition occurring is minimized.

Figure 8:
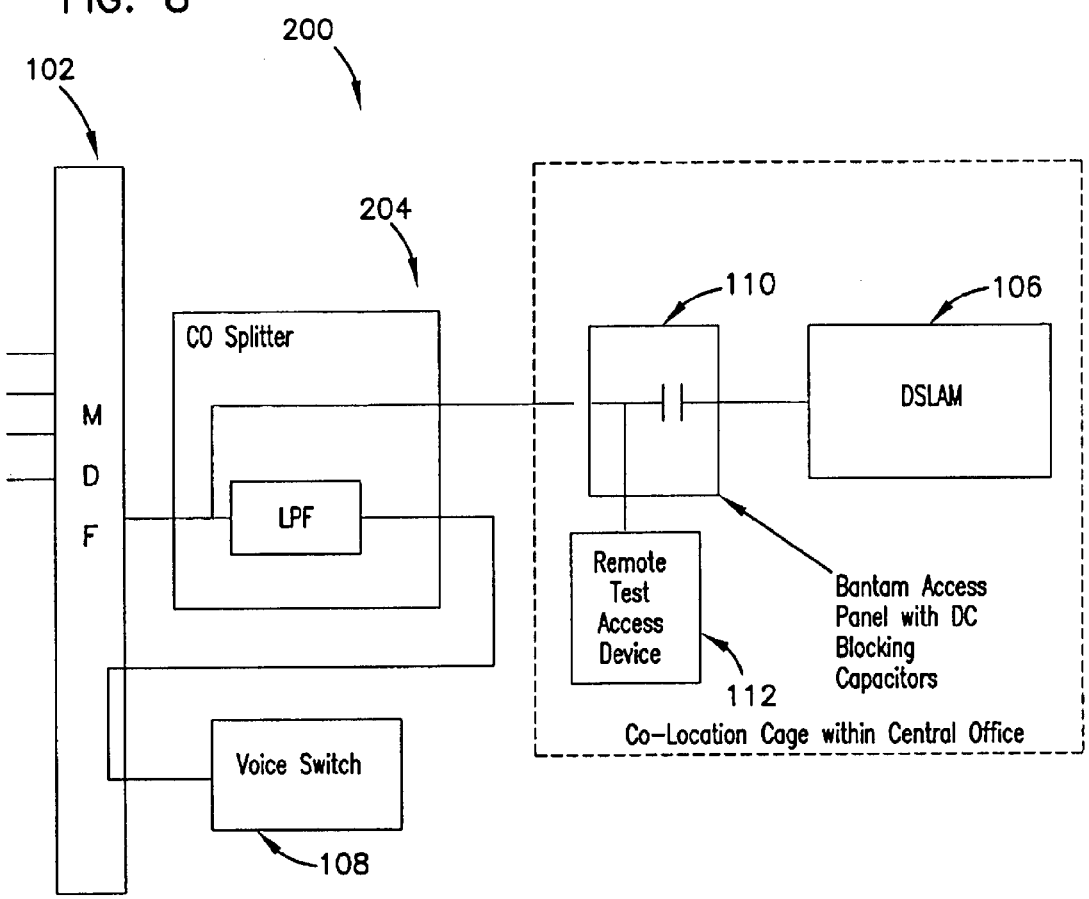
FIG. 8 is a diagram of another preferred embodiment of a telecommunication system according to the present invention.

FIG. 8 is a diagram of a telecommunication system 200 according to a second preferred embodiment of the present invention. The system 200 is similar to that shown in FIG. 7 except that ILEC owns the splitter unit 204 so it is not located in the collocation cage. Otherwise, the advantages and disadvantages are the same as discussed with reference to FIG. 7.

FIG. 9 is a diagram of a telecommunication system 300 according to a third preferred embodiment of the present invention. In this preferred embodiment the ILEC owns the splitter unit. In this preferred embodiment the DSLAM is coupled directly to the splitter unit. The access panel is coupled directly to the MDF and the input of the splitter unit. When testing is done through the access panel, the splitter unit is disconnected resulting in true metallic access by the remote test access device. In this preferred embodiment the DC blocking capacitors may remain in the splitter unit or not depending on the particular hardware chosen for the application. In a preferred embodiment, a high pass frequency filter (not shown) is located in the DSLAM to filter out the voice signals from the data signals. Alternatively, it may be provided in the splitter unit or partially in the splitter unit and partially in the DSLAM.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A telecommunications system comprising:
   a main distribution frame operatively coupled to signal lines of a telecommunication carrier
   an access panel having inputs and outputs, the access panel also including test ports for allowing a test device to be coupled to the access panel wherein the inputs and outputs of the access panel are operatively coupled together unless a test device is coupled to the test ports and in that case the inputs are disconnected from the outputs, the inputs of the access panel are operatively coupled to the main distribution frame;
   a splitter unit operatively coupled to the main distribution frame to receive mixed voice and data signals from the main distribution frame wherein the splitter unit has first outputs and second outputs and the splitter unit separates the voice signals from the mixed signals and outputs the voice signals at the first outputs;
   a voice switch operatively coupled to the first outputs of the splitter unit; and
   a multiplexer operatively coupled to the second outputs of the splitter unit, wherein whenever a test device is coupled to the test ports of the access panel, the test device has direct metallic access to the signal lines of the telecommunication carrier for testing.

2. The system of claim 1 wherein the access panel and multiplexer are located in a collocation cage of the telecommunication carrier's central office.

3. The system of claim 2 wherein the outputs of the access panel are operatively coupled to inputs of the splitter unit so that the splitter unit is coupled to the main distribution frame through the access panel.

4. The system of claim 3 wherein whenever a test device is coupled to the test ports of the access panel, the splitter unit is disconnected from the main distribution frame.

5. The system of claim 1 wherein the inputs of the access panel are coupled to the second outputs of the splitter unit thereby operatively coupling the access panel to the main distribution frame through the splitter unit.

6. The system of claim 5 wherein the access panel includes DC blocking capacitors coupled between the inputs and the outputs of the access panel for maintaining DC isolation at the second outputs of the splitter unit.

7. The system of claim 1 wherein the multiplexer is a digital subscriber line access multiplexer.

8. The system of claim 1 further comprising DC blocking capacitors coupled to the second outputs of the splitter unit.

9. The system of claim 3 wherein the multiplexer is coupled directly to the splitter unit.

10. The system of claim 3 further comprising DC blocking capacitors coupled to the second outputs of the splitter unit wherein the DC blocking capacitors are in the splitter unit.

11. The system of claim 3 wherein the access panel is coupled directly to the main distribution frame.

12. A telecommunications system comprising:
   a main distribution frame operatively coupled to signal lines of a telecommunication carrier;

an access panel having inputs coupled directly to the main distribution frame and outputs operatively coupled to the inputs, the access panel also including test ports for allowing a test device to be coupled to the access panel wherein the inputs are disconnected from the outputs whenever a test device is coupled to the test ports;

a splitter unit operatively coupled to the main distribution frame to receive mixed voice and data signals from the main distribution frame wherein the splitter unit has first outputs and second outputs and the splitter unit separates the voice signals from the mixed signals and outputs the voice signals at the first outputs and wherein the splitter unit is disconnected from the main distribution frame whenever a test device is coupled to the test ports of the access panel;

a voice switch operatively coupled to the first outputs of the splitter unit; and a multiplexer operatively coupled to the second outputs of the splitter unit, wherein a test device has direct metallic access to the signal lines of the telecommunication carrier whenever the test device is coupled to the test ports of the access panel.

13. The system of claim 12 wherein the access panel and multiplexer are located in a collocation cage of the telecommunication carrier's central office.

14. The system of claim 12 further comprising DC blocking capacitors operatively coupled between inputs of the splitter unit and the second outputs.

15. The system of claim 12 where in the access panel is coupled directly to the inputs of the splitter unit and wherein the splitter unit receives the mixed voice and data signals through the access panel.

16. The system of claim 13 wherein the splitter unit is located outside of the collocation cage.

17. The system of claim 12 wherein the multiplexer is coupled directly to the splitter unit.

* * * * *